Figure 1:
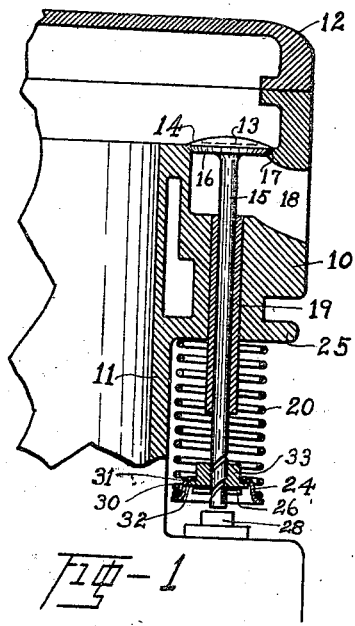

W. W. WRIGHT.
INTERNAL COMBUSTION ENGINE VALVE SPRING COMPRESSOR.
APPLICATION FILED JUNE 1, 1920.

1,435,779.

Patented Nov. 14, 1922.

Inventor
Wm Warren Wright
By Bates & Macklin
Attorneys

Patented Nov. 14, 1922.

1,435,779

UNITED STATES PATENT OFFICE.

WILLIAM WARREN WRIGHT, OF CLEVELAND, OHIO.

INTERNAL-COMBUSTION-ENGINE VALVE-SPRING COMPRESSOR.

Application filed June 1, 1920. Serial No. 385,540.

*To all whom it may concern:*

Be it known that I, WILLIAM WARREN WRIGHT, a citizen of the United States, residing at Cleveland, in the county of Cuyahoga and State of Ohio, have invented a certain new and useful Improvement in Internal-Combustion-Engine Valve-Spring Compressors, of which the following is a full, clear, and exact description, reference being had to the accompanying drawings.

This invention relates to means for facilitating the insertion and removal of valves of an internal combustion engine, more particularly of the type for use in automobiles.

In the usual motor construction the valve head is normally urged toward its seat by a helical spring surrounding the stem and reacting between a flange on the cylinder block and a slidable spring retainer on the end of the stem, this retainer being held on the stem against the thrust of the spring by a key or pin inserted in a transverse opening through the stem.

In assembling or removing a valve it is necessary to force the spring retainer towards the valve head by compressing the spring, in order to separate the retainer and the transverse opening to permit the insertion or withdrawal of the pin. Heretofore there have been several ways to accomplish this result. The valve head may be held in a seated position while the retainer is pried toward the valve head by a suitable tool, or the latter step may be taken first, in which case the valve usually travels by reason of its spring connection with the retainer, requiring subsequently to be forced back, thus moving the stem through the retainer. Or a tool may be employed to simultaneously hold the valve head seated and move the spring retainer toward the head.

In any of the methods heretofore employed some implement must be applied to the spring retainers, and by reason of the limited space around them between the flanges of each cylinder and between the several cylinders, it is quite difficult with such implement in position to successfully manipulate the transverse pin or key with respect to the opening in the stem, or to insert or remove the valves in any manner except by dismantling the motor to a greater or less extent, thus causing a great deal of inconvenience and the loss of considerable time.

The object of my invention is the provision of means whereby the spring retainer on the end of the valve stem may be moved relative to the opening in the stem by simply rotating the valve. In the preferred form, I accomplish this by providing a helical groove and tongue connection between the spring retainer and the valve stem, whereby rotation of the latter in the proper direction, as by the blade of a screw driver or equivalent tool applied to the usual slot in the valve head, may cause the retainer and the transverse pin receiving opening to be moved apart, permitting the ready insertion or removal of the pin by reason of the absence of any external obstructing means adjacent thereto.

The invention is hereinafter more fully described and its essential characteristics are summarized in the claims.

Figure 2:
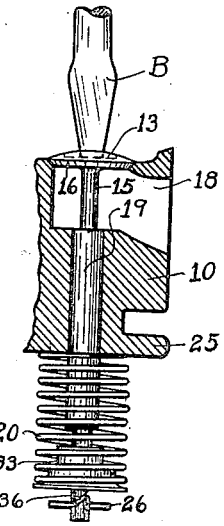
Figure 3:
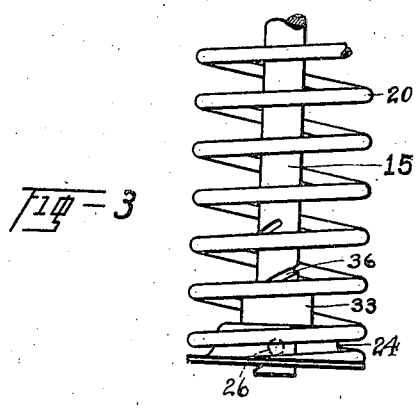
Figure 4:
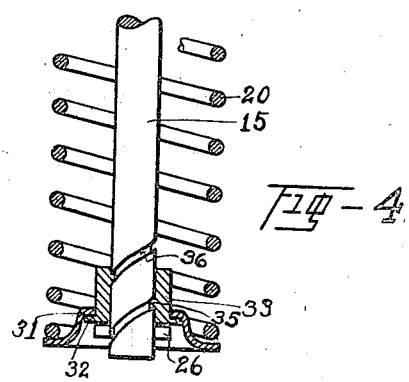
Figure 5:
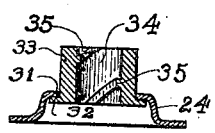

In the drawings, Fig. 1 is a vertical section through a cylinder head showing a valve seated therein having a stem and spring retainer embodying my invention; Fig. 2 is a similar view showing the spring retainer separated from the transverse pin, and means for effecting such result; Fig. 3 is a side elevation of my improved valve stem and spring retainer; Fig. 4 is a vertical section through the same with the stem in elevation; and Fig. 5 is a central section through the spring retainer.

Referring to the drawings by numerals, 10 designates the upper flange of a cylinder block and 11 a cylinder of an internal combustion engine of usual construction adapted for use in an automobile. The numeral 12 indicates the usual cylinder head or cap. Within the flange 10 a valve having a head 14 and a stem 15 is slidably mounted, the head 14 being ground at 16 in the usual manner to fit the seat 17 of the port 18. The stem 15 is shown reciprocable within the usual gas tight bushing 19 and its lower end is surrounded by a helical spring 20 compressed between a spring retainer 24 on the end of the stem and the lower surface 25 of the flange 10 for urging the valve into its seated position. The retainer 24 is shown having the usual inverted cup form and is retained on the end of the stem by a transverse pin or key 26 projecting laterally through an opening near the end of the stem and occupying the recess in the cup shaped retainer. When the motor is running the valve is moved intermittently against the tension of the spring 20 in the usual manner by means of the engagement of the end of the stem 15 by a suitable member as a plunger 28 reciprocated by the cam shaft (not shown).

In my invention as heretofore stated, I provide means whereby the spring retainer may be moved along the valve stem, avoiding the necessity of inserting a tool beneath the retainer. A satisfactory embodiment of such means is shown in the drawings comprising the substitution of a helical groove and tongue for the loose sliding connection between the end of the valve stem and the spring retainer. As shown the spring retainer 24 comprises an annular wall 30 having a flange 31 engaging a flange 32 on a base 33 having a central opening 34 adapted to receive the end of the valve stem 15. The interior wall of the base 33 is shown having a helical rib or tongue 35 adapted to engage a corresponding groove or thread 36 on the end of the valve stem 15. This groove has a steep pitch sufficient (when the valve is in operation) to enable the spring 20 to cause the spring retainer to be thrust against the pin 26 with the base 33 engaging the projecting ends of such pin and with the wall 30 embracing the ends thereby preventing its accidental dislodgment from the transverse opening in the stem.

While I prefer to construct the tongue 35 as a portion of an internal thread it will be obvious that it may consist simply of a pin or lug adapted to engage the corresponding groove. It will be apparent also that the tongue and groove thread portions 35 and 36 may be reversed with respect to the valve stem 15 and spring retainer 24 if desired.

When it is desired to remove or insert a valve it is necessary only to remove the head 12 and apply a screw driver blade or similar tool B to the usual slot or other opening 13 ordinarily formed in the valve head 14 and rotate the same in the proper direction to cause the stem 15 to travel through the spring retainer 24 and compress the spring 20, by reason of the tongue and groove connection described. Thus the spring retainer and the transverse opening in the end of the stem may be quickly and easily moved apart to permit the pin 26 to be readily inserted or removed. As above stated the pitch of the groove 36 is sufficient to cause the spring retainer to invariably occupy its normal position against the pin 26 when the engine is working.

From the foregoing it will be apparent that I have provided a simple and reliable valve spring compressor which can be cheaply manufactured and which in use will greatly reduce the time and labor involved in the adjustment of the valves.

Having thus described my invention, I claim:

1. In combination, a valve stem, a spring retainer slidable thereon, a pin extending through the stem adapted to be engaged by said retainer, and a tongue and groove connection of steep pitch between the stem and retainer, whereby by rotating one of them the retainer and pin may be separated.

2. In mechanism of the character described, a valve stem, a removable pin extending transversely through an opening in the end thereof, a spring surrounding said stem, a spring retainer urged against said pin by said spring, and means for moving said stem and spring retainer longitudinally relative to each other by rotating one of said members.

3. In an automobile engine valve, a valve stem having a removable transverse pin projecting therethrough, a spring retainer normally pressed against said pin and embracing the ends thereof, and means for moving said spring retainer axially of the stem by rotating the stem.

4. An internal combustion engine valve having a stem reciprocable under the influence of a spring, a spring retainer engaged by one end of the spring and movable on the stem, a laterally projecting pin removably engaging a transverse opening through the stem and adapted to receive the thrust of the spring transmitted through the spring retainer, and a helical groove and tongue connection between said retainer and stem.

5. An automobile engine valve comprising a valve stem, a removable transverse pin adapted to extend through an opening in such stem, a spring retainer normally urged against said pin, said retainer having an annular wall embracing the ends of said pin, and means comprising a helical groove and tongue connection between said stem and spring retainer whereby said retainer may be moved along said stem away from said pin receiving opening by rotating one of said elements.

6. An automobile engine valve comprising a valve stem, a removable transverse pin extending through an opening in such stem, a spring retainer slidable on said stem and normally urged against said pin, said retainer having an annular wall embracing the ends of said pin, and a base having an opening to receive the stem, a tongue on said base and a helical groove on said stem adapted to coact therewith, whereby said retainer may be moved along said stem away from said pin receiving opening by rotating said stem.

In testimony whereof, I hereunto affix my signature.

WILLIAM WARREN WRIGHT.